US010956157B1

(12) United States Patent
Kaplan et al.

(10) Patent No.: US 10,956,157 B1
(45) Date of Patent: Mar. 23, 2021

(54) TAINT PROTECTION DURING SPECULATIVE EXECUTION

(71) Applicant: ADVANCED MICRO DEVICES, INC., Santa Clara, CA (US)

(72) Inventors: David Kaplan, Austin, TX (US); Marius Evers, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 15 days.

(21) Appl. No.: 16/293,154

(22) Filed: Mar. 5, 2019

Related U.S. Application Data

(60) Provisional application No. 62/639,179, filed on Mar. 6, 2018, provisional application No. 62/698,677, filed on Jul. 16, 2018.

(51) Int. Cl.
*G06F 9/30* (2018.01)
*G06F 9/38* (2018.01)

(52) U.S. Cl.
CPC ........ *G06F 9/30098* (2013.01); *G06F 9/3842* (2013.01)

(58) Field of Classification Search
None
See application file for complete search history.

(56) References Cited

U.S. PATENT DOCUMENTS

| | | |
|---|---|---|
| 5,367,648 A | 11/1994 | Chuang et al. |
| 5,778,219 A | 7/1998 | Amerson et al. |
| 6,301,705 B1 | 10/2001 | Doshi et al. |
| 6,374,333 B1 | 4/2002 | Arimilli et al. |
| 6,675,192 B2 | 1/2004 | Emer et al. |
| 6,766,447 B1 | 7/2004 | Jue et al. |
| 7,114,059 B2 * | 9/2006 | Wilkerson .......... G06F 9/30072 712/217 |
| 7,398,390 B2 * | 7/2008 | Hyser .................. G06F 21/577 713/165 |
| 7,613,911 B2 * | 11/2009 | Burdass ............... G06F 9/3861 712/244 |
| 7,788,235 B1 * | 8/2010 | Yeo ...................... G06F 21/606 707/687 |
| 8,789,169 B2 * | 7/2014 | Otani .................. G06F 9/30138 712/208 |

(Continued)

OTHER PUBLICATIONS

U.S. Appl. No. 16/293,266, filed Mar. 5, 2019, listing David Kaplan, et al. as inventors, entitled, "Selective Use of Taint Protection During Speculative Execution," 48 pages.

(Continued)

*Primary Examiner* — Eric Coleman

(57) ABSTRACT

A subset of a set of architectural registers in a processing system is marked (or "tainted") to indicate that speculative use of data in the subset of the architectural registers is constrained based on a taint handling policy. One or more speculation features supported by the processing system are disabled for the instruction so that the one or more speculation features cannot be used on data in the subset. In some cases, values of bits associated with the subset of architectural registers are modified to indicate that the subset is tainted. The taint handling policy can be indicated by values stored in a policy register. Taint markings are tracked in response to values stored in the tainted architectural registers being written to a memory or read from the memory.

40 Claims, 8 Drawing Sheets

(56) References Cited

U.S. PATENT DOCUMENTS

| | | | |
|---|---|---|---|
| 8,918,626 B2 | 12/2014 | Chou et al. | |
| 8,959,318 B2* | 2/2015 | Grisenthwaite | G06F 9/30101 |
| | | | 712/229 |
| 2007/0118696 A1 | 5/2007 | McCauley et al. | |
| 2008/0216175 A1* | 9/2008 | Pike | G06F 21/52 |
| | | | 726/22 |
| 2009/0172644 A1* | 7/2009 | Nagarajan | G06F 8/33 |
| | | | 717/128 |
| 2011/0145918 A1* | 6/2011 | Jung | G06F 3/0622 |
| | | | 726/22 |
| 2011/0314342 A1 | 12/2011 | Gilkerson et al. | |
| 2013/0086365 A1* | 4/2013 | Gschwind | G06F 9/30072 |
| | | | 712/220 |
| 2014/0237614 A1* | 8/2014 | Irvine | H04L 9/3247 |
| | | | 726/26 |
| 2015/0128262 A1* | 5/2015 | Glew | G06F 21/577 |
| | | | 726/23 |
| 2016/0098274 A1 | 4/2016 | Loewenstein et al. | |
| 2016/0232346 A1* | 8/2016 | Paddon | G06F 21/552 |
| 2017/0177472 A1 | 6/2017 | Frazier et al. | |
| 2017/0371667 A1 | 12/2017 | Fei | |

OTHER PUBLICATIONS

Non-Final Office Action dated Jun. 8, 2020 for U.S. Appl. No. 16/293,266, 30 pages.

Chen, Haibo, et al., "From Speculation to Security: Practical and Efficient Information Flow Tracking Using Speculative Hardware", International Symposium on Computer Architecture, 2008, 12 pages.

Notice of Allowance dated Oct. 14, 2020 for U.S. Appl. No. 16/293,266, 28 pages.

\* cited by examiner

US 10,956,157 B1

TAINT PROTECTION DURING SPECULATIVE EXECUTION

CROSS REFERENCE TO RELATED APPLICATIONS

This application claims priority to the U.S. Provisional Patent Application Ser. No. 62/639,179 filed on Mar. 6, 2018 and entitled "Managing Speculation Side-Channels Through Hardware Tainting," which is hereby incorporated by reference in its entirety. This application also claims priority to the U.S. Provisional Patent Application Ser. No. 62/698,677 filed on Jul. 16, 2018 and entitled "Taint Protection During Speculative Execution," which is hereby incorporated by reference in its entirety.

BACKGROUND

Speculative execution of instructions is used to enhance performance of processing systems. For example, a processing unit can predict the outcome of a branch instruction using information in a branch prediction structure. Speculative execution of subsequent instructions along the predicted branch is performed before the processing unit has evaluated the branch instruction. If the predicted branch turns out to be incorrect when the processing unit evaluates the branch instruction, speculative execution along the incorrectly predicted branch is suspended and the state of the processing unit is rolled back to the state at the branch instruction. After the rollback, execution resumes along the correct branch. Examples of branch prediction structures used in such branch prediction operations include indirect branch predictors that redirect the flow of the program to an arbitrary instruction, a return address stack that includes return addresses for subroutines executing on the processing unit, and a branch target buffer that includes information for predicting the presence and target addresses of branch instructions. Some implementations of branch prediction structures use a branch history of the results of branch instructions executed by processes that were previously, or are currently, executing on the processing unit as part of the prediction algorithm.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
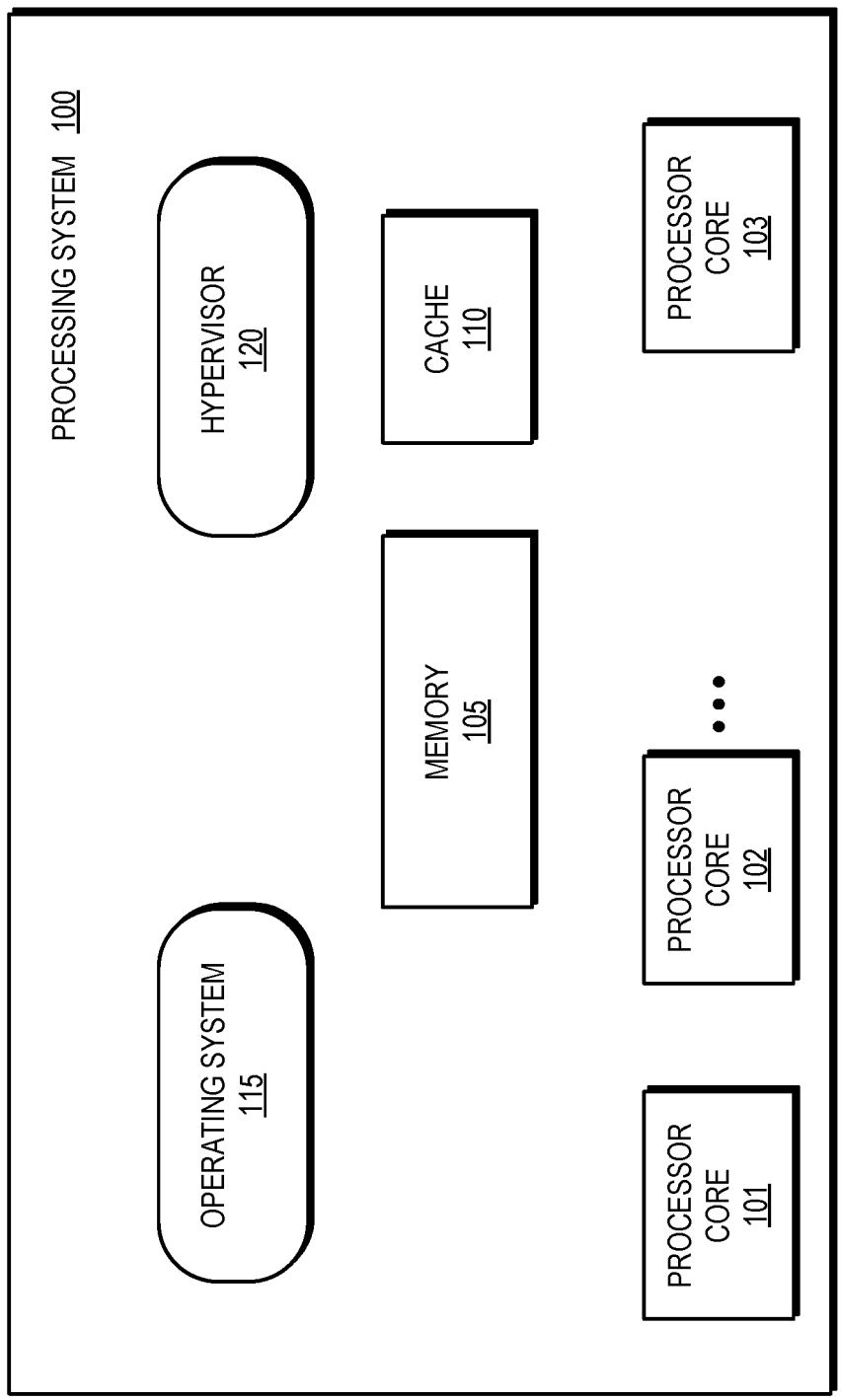
FIG. 1 is a block diagram of a processing system that implements speculative execution taint protection according to some embodiments.

Although speculative execution improves performance by commencing execution of predicted future instructions prior to the completion of "older" instructions, the speculative execution of certain instructions, such as memory loads, may cause side effects on caches and other microarchitectural states. In certain cases, the microarchitectural state change creates a side channel that allows information to leak from one entity to another. This side channel is of particular concern when a trusted entity provides services to an untrusted program. For example, during a system call, the control flow crosses a hardware privilege boundary between kernel space and user space, which may cause the processor to consume or use untrusted values that are provided from the user space, e.g., via user-controlled registers. Control flows can also cross software boundaries that are not visible to hardware. For example, during execution of code that implements a browser, control flows can cross software boundaries corresponding to different tabs in the browser. Unintended information leakage can result if a processor consumes or uses untrusted values provided by the untrusted program during speculative execution.

FIGS. 1-10 disclose a processing system that is protected from the effects of side channels by marking (or "tainting") one or more values of architectural registers to indicate that speculative use of data in the tainted registers is constrained based on a taint handling policy. The architectural registers are mapped to physical registers including general purpose registers, integer registers, floating point registers, or other registers. Some embodiments of the taint handling policy block a subset of a plurality of speculation features that are supported by the processing system so that the subset cannot be used on data in the tainted registers. For example, the taint handling policy can prevent a pipeline in the processing system from utilizing data loaded from a tainted source until the corresponding load instruction has retired. One or more additional bits are added to (or associated with) each architectural register and values of the additional bits indicate whether the corresponding architectural register is tainted or not. In some embodiments, multiple tainting bits are used to indicate larger sets of states, such as an untainted state, a tainted state, a danger state, and a danger state that is about to be cleared. Different actions are applied to the states in the set according to the taint handling policy.

Data values in a set of architectural registers are marked as tainted using software-controlled explicit tainting or hardware-controlled implicit tainting. Software modifies the tainting bits using instruction set architecture (ISA) instructions, e.g., when untrusted data is copied into a trusted environment. In some embodiments, data is considered untainted unless the software explicitly marks the data as tainted and in other embodiments data is considered tainted unless the software explicitly marks the data as untainted. Some embodiments of the system include hardware that automatically taints some data such as data that crosses a hardware privilege boundary and can be reliably traced to its source. For example, hardware taints data that is read by the kernel from a page marked as a user page. For another example, hardware taints architectural registers that are controlled by a user when control flow crosses a hardware privilege boundary such as during a system call. The hardware is implemented as a processing system, processing unit, processor core, application-specific integrated circuit (ASIC), field programmable gate array (FPGA), or other circuitry. In some embodiments, a set of policies for handling tainted data values is indicated by a policy register that includes a plurality of bits to indicate whether corresponding policies are implemented in the processing system. The bits in the policy register can be subdivided into default policies that are implemented unless specifically disabled by the software and optional policies that are not implemented unless specifically enabled by the software.

As discussed above, tainting of architectural registers is used to mark untrusted data in some embodiments. However, tainting is not limited to marking untrusted data. In some embodiments, architectural registers are tainted to indicate other properties of the values in the registers. For example, the architectural registers can be tainted to indicate that the values in the registers are "secret" and are not to be used speculatively to avoid leaking the secret values through side channels.

During execution, tainted data is tracked in response to operations that read, write, or modify the tainted data. Taint markings for source registers are propagated to destination registers. In some embodiments, a destination register for an operation is marked as tainted if and only if one or more of the source registers for the operation is also marked as tainted. Hardware performs taint propagation so that the subset of the registers in the physical register file that are tainted at any given time is known and can be anticipated by a compiler. Data in tainted registers can be written to a memory space by software, stored in memory during a compiler-generated spill/fill sequences, or be written to memory for other reasons. Taint markings may be tracked through the memory. In some embodiments, a data type for the data stored in the memory indicates whether the data is tainted or non-tainted. For example, every eight bytes of data stored in a memory can be followed by a bit indicating whether the previous eight bytes are tainted or untainted. Tainted data can also be indicated by an address range or region in memory that is reserved for storing tainted data. In some embodiments, tainted data are encrypted or otherwise obfuscated when stored in the memory. If encryption or other obfuscation is used, software instructions that read or write from the memory specify if the memory location is expected to be tainted so that the processor can encrypt/obfuscate values prior to writing the values to the memory and decrypt/de-obfuscate tainted values that are read from memory. Data that is loaded into a register based on a tainted value, e.g., an address stored in a tainted register, is marked as dangerous data. Dependency tracking is used to identify subsequent speculative operations involving the dangerous data, which may be blocked until the original load instruction retires. Although not required, preventing the use of dangerous data by dependency tracking can limit exposure of the processing system to side channels while having a smaller performance hit relative to limiting speculation in general.

FIG. 1 is a block diagram of a processing system 100 that implements speculative execution taint protection according to some embodiments. The processing system 100 implements processing circuitry such as one or more processor cores 101, 102, 103, which are collectively referred to herein as "the processor cores 101-103." The processor cores 101-103 execute applications (e.g., as represented by sequences of instructions or operations) that are stored in a memory 105. Some embodiments of the memory 105 are implemented as dynamic random access memory (DRAM). The processor cores 101-103 access the instructions using physical addresses, virtual addresses, or addresses of cache lines in embodiments that implement caching of instructions in a cache 110 or other portions of a cache hierarchy such as caches implemented in the processor cores 101-103. Results of the instructions executed by the processor cores 101-103 are stored in the memory 105. The processor cores 101-103 execute instructions sequentially, concurrently, or in parallel with each other. The privilege level of a process executing on one of the processor cores 101-103, the guest/hypervisor status of the process and other context state are known and controlled by a management layer including an operating system (OS) 115 for the processing system 100 or a hypervisor 120 of one or more virtual machines that are executing in the processing system 100.

Figure 2:
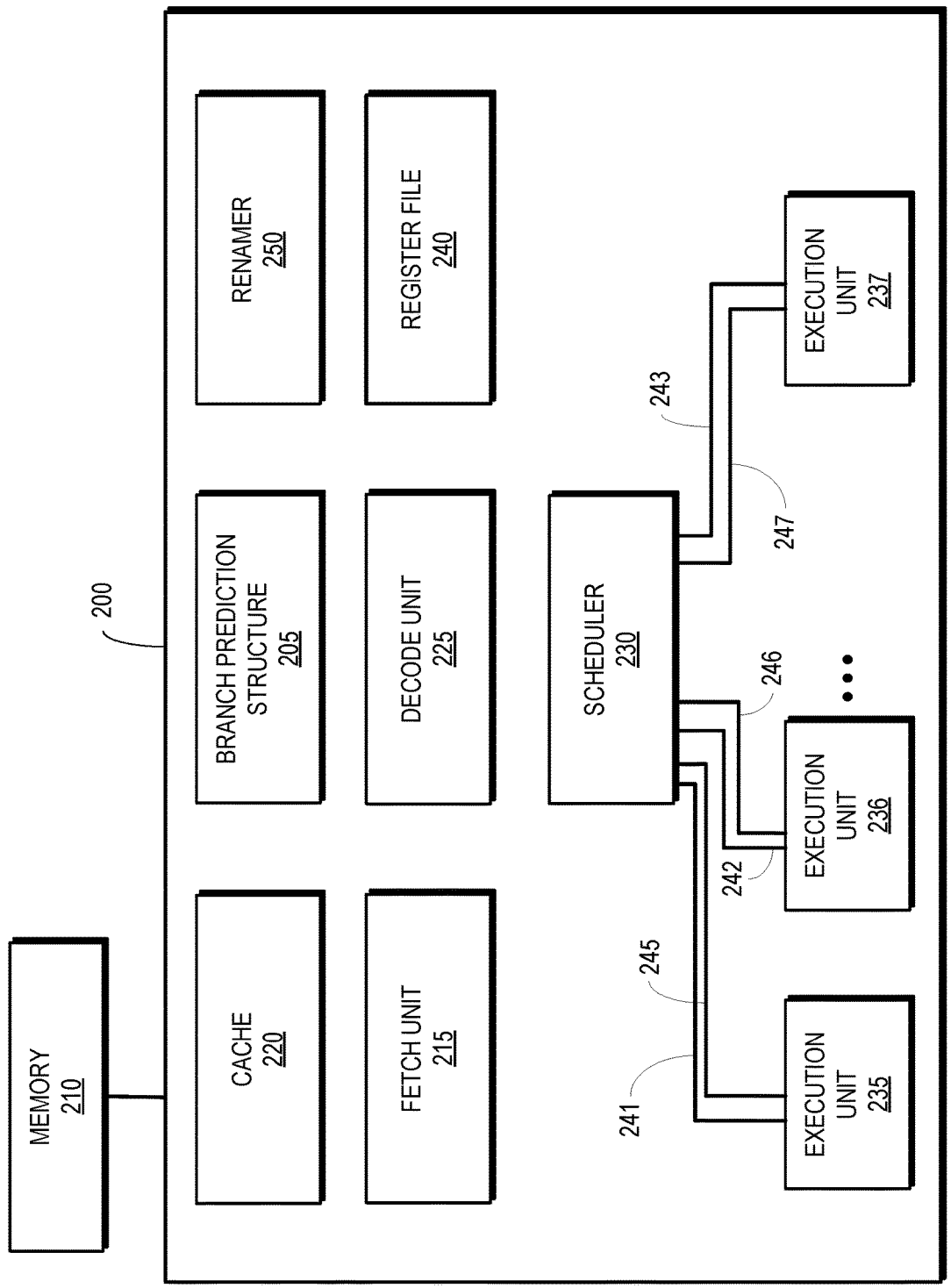
FIG. 2 is a block diagram of a processor core according to some embodiments.

FIG. 2 is a block diagram of a processor core 200 according to some embodiments. The processor core 200 is used to implement some embodiments of the processor cores 101-103 shown in FIG. 1. The processor core 200 includes a branch prediction structure 205 that provides addresses of locations in a memory 210 to a fetch unit 215. Some embodiments of the branch prediction unit 205 include a branch target buffer (BTB) or indirect target predictor. The memory 210 is used to implement some embodiments of the memory 105 shown in FIG. 1. The fetch unit 215 reads the bytes representing the instruction from the memory 210 (or associated cache 220) and sends the instruction to a decode unit 225. The decode unit 225 examines the instruction bytes and determines the function of the instruction. The decode unit 225 translates (i.e., decodes) the instruction to generate a series of operations to be performed by the processor core 200.

Operations generated by the decode unit 225 are written to a scheduler 230. The scheduler 230 determines when source values for an operation are ready, e.g., when source values for the operation are available in a register file 240 such as an x86 register file. Physical registers in the register file 240 are mapped to architectural registers that are used in the instructions retrieved from the memory 210 or the associated cache 220. In the illustrated embodiment, mapping of the architectural registers to the physical registers in the physical register file 240 is performed by a renamer 250 that converts or "renames" the architectural registers into tags that refer to the physical registers.

In response to the values indicated by the architectural registers being available in the corresponding physical registers, the scheduler 230 schedules the operation for execution and transmits the operation and the source values to one or more execution units 235, 236, 237, which are collectively referred to herein as "the execution units 235-237," to perform the operation. The lines, traces, buses, or other connections that are used to convey information from the scheduler 230 to the execution units 235-237 are indicated by the lines 241, 242, 243, which are collectively referred to herein as "the lines 241-243." In some embodiments, one or more additional lines 245, 246, 247 (collectively referred to herein as "the lines 245-247") are used to convey tainting information included in (or associated with) the instructions/operations, as discussed herein. In response to completing the operation, the result is written back to a destination architectural register that indicates a physical register in the physical register file 240. Some embodiments of the register file 240 include registers that are used to implement primitives used for taint protection, such as encryption or other obfuscation, as discussed herein.

Some embodiments of the branch prediction structure 205 include entries associated with the branch instructions that have been previously executed by the current process or a process that previously executed on the processor core 200. Branch prediction information stored in each entry of the branch prediction structure 205 indicates a likelihood that the branch instruction directs the program flow to an address of an instruction. The execution units 235-237 access the entries in the branch prediction structure 205 based on an address of the corresponding branch instruction. For example, the values of the bits (or a subset thereof) that represent a physical address, a virtual address, or a cache line address of the branch instruction is used as an index into the branch prediction structure 205. For another example, hashed values of the bits (or a subset thereof) is used as the index into the branch prediction structure 205. Examples of branch prediction structures include a BTB, an indirect branch predictor, a return address stack, a conditional branch predictor, a branch history, or any other predictor structure that is used to store the branch prediction information.

Taint protection is provided for the processor core 200 by incorporating a data structure that includes bits having values that indicate whether speculative use of data in the architectural registers (and the corresponding physical registers in the physical register file 240) is constrained based on a taint handling policy. Some embodiments of the physical register file 240 include the data structure, although the data structure can also be implemented external to the physical register file 240. Tainted registers are only used in limited speculation to avoid side channels, while untainted registers are used more aggressively during speculation. Some embodiments of the processor core 200 taint a subset of the architectural registers to indicate that speculative use of data in the tainted subset of the architectural registers is constrained based on a taint handling policy. The processor core 200 then selectively disables one or more speculation features supported by the processor core 200 for instructions or operations so that the disabled speculation features cannot be used on data in the tainted subset of the architectural registers.

Figure 3:
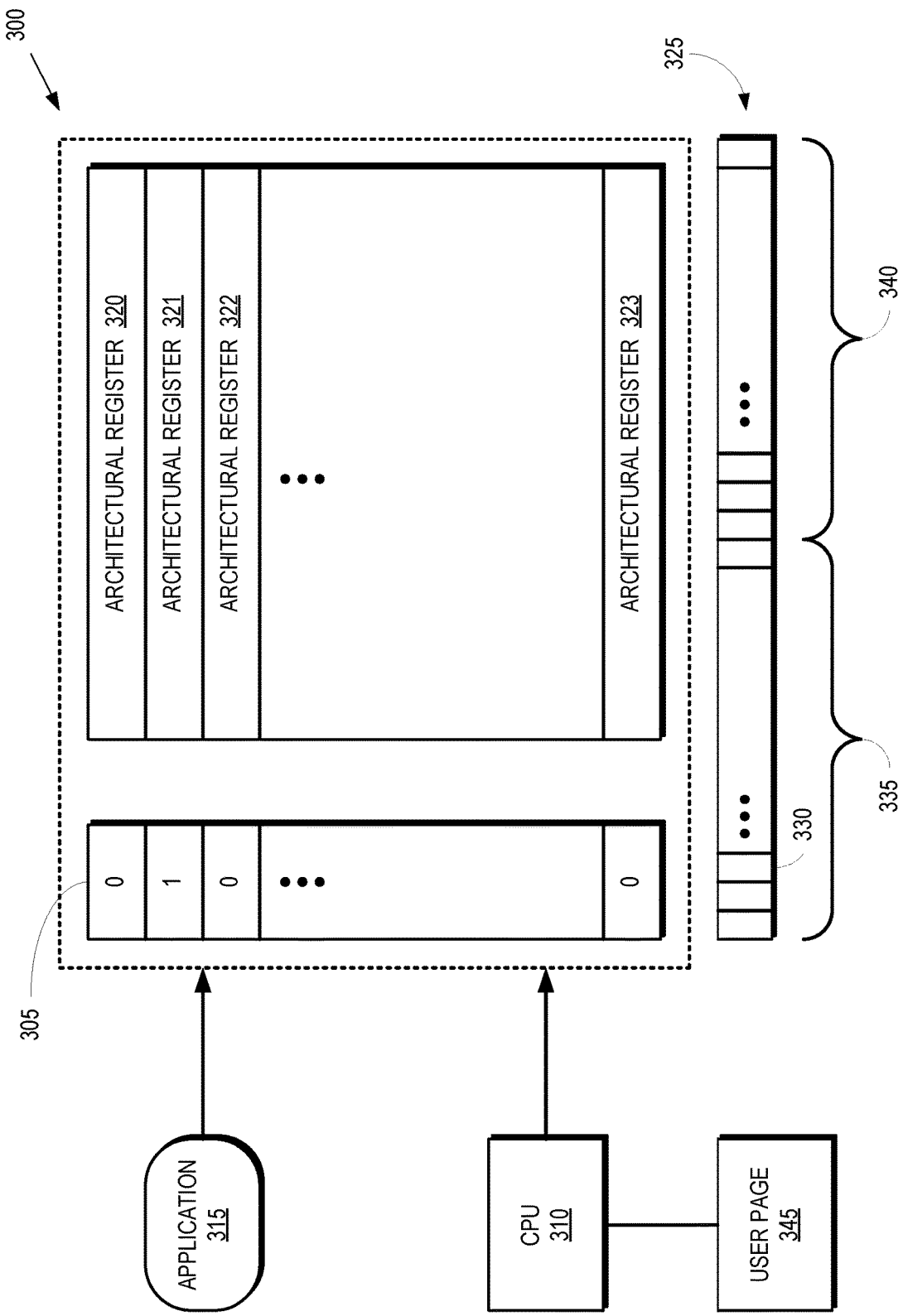
FIG. 3 is a block diagram of a processing system that includes a data structure for indicating tainted architectural registers according to some embodiments.

FIG. 3 is a block diagram of a processing system 300 that includes a data structure 305 for indicating tainted architectural registers according to some embodiments. The processing system 300 corresponds to some embodiments of the processing system 100 shown in FIG. 1. The processing system 300 includes a central processing unit (CPU) 310 or other processing unit, processor core, compute unit, and the like. The CPU 310 executes instructions that represent an application 315 or other software or program code. Instructions that represent the application 315 for execution by the CPU 310 are drawn from an instruction set architecture (ISA) that references a set of architectural registers 320, 321, 322, 323 (collectively referred to herein as "the architectural registers 320-323"). The number of architectural registers 320-323 depends on the hardware architecture implemented in the processing system 300. For example, the number of architectural registers 320-323 implemented by the processing system 300 can be 32, 64, or another number. The sizes of the architectural registers 320-323 can be 32 bits, 64 bits, or other numbers of bits.

The data structure 305 includes entries associated with each of the architectural registers 320-323. The entries are represented by one or more bits and the values of the bits indicate whether the corresponding architectural register is tainted. For example, values of "0" in entries of the data structure 305 indicate that the architectural registers 320, 322, 323 are untainted and the value of "1" in an entry of the data structure 305 indicates that the architectural register 321 is tainted. Utilization of data stored in the tainted architectural registers, such as the architectural register 321, is constrained by a corresponding taint handling policy that indicates the speculation features that are blocked with tainted data. For example, an implementation may support a policy that prevents tainted data from directly influencing a load address since this may create a side channel. In some embodiments, the entries in the data structure 305 include more than one bit and the multiple bits are used to indicate multiple taint states of the corresponding architectural registers 320-323.

The processing system 300 supports software-controlled explicit tainting. Software-controlled explicit tainting uses explicit ISA instructions to mark values as tainted, e.g., by changing values in the entries of the data structure 305. Examples of ISA instructions include a "set taint" instruction that sets a value of an entry in the data structure 305 to indicate that the corresponding architectural register is tainted, a "clear taint" instruction that sets a value of an entry in the data structure 305 to indicate that the corresponding architectural register is not tainted, a "read taint" instruction to read the architectural state that indicates the tainted/untainted architectural registers by reading one or more values from the data structure 305, and a "write taint" instruction to write the architectural state that indicates the tainted/untainted architectural registers by writing one or more values of the data structure 305 to another location indicated in the write taint instruction. Explicit tainting occurs on "copy-in," when untrusted data is copied into a trusted environment. By default, values in the architectural registers 320-323 are not considered tainted unless software such as the application 315 explicitly utilizes the ISA instructions that create/mark data as tainted. Software-controlled explicit tainting is used to implement software sandboxes within a single hardware privilege boundary.

Some embodiments of the processing system 300 also support hardware-controlled implicit tainting, which allows hardware such as the CPU 310 to automatically taint data under certain circumstances. Some embodiments of the CPU 310 automatically taint data when a hardware privilege boundary exists and the CPU 300 can reliably determine the source of the data. For example, if the kernel executing on the CPU 310 reads data from a page 345 marked as a user-page, the CPU 310 automatically taints the data by changing a corresponding value of an entry in the data structure 305. Additionally, when a control flow crosses a hardware privilege boundary (e.g., a system call), the CPU 310 automatically taints values of the architectural registers 320-323 that are controlled by the user. Hardware tainting provides additional robustness and protection against software bugs. Hardware tainting may provide a performance benefit over software tainting in certain circumstances such as around system calls.

Some embodiments of the processing system 300 provide a configurable taint policy using a taint policy register 325. The policy is represented by values of bits 330 (only one indicated by a reference numeral in the interest of clarity) in the taint policy register 325. The architectural details of this policy are vendor-specific and the processing system 300 has discretion to implement one or more bits in this policy. In some cases, the definition of the taint policy is architectural to simplify migration. For example, implementing an architectural definition of a taint policy simplifies moving (or migrating) a workload such as a virtual machine from one physical machine that implements one set of physical registers to another physical machine that implements a different set of physical registers. That is, all processors of a specific vendor use the same bit position in the taint policy register to indicate the same policy.

To support future compatibility, some embodiments of the taint policy register 325 are divided into two halves 335, 340. One half 335 of the taint policy register 325 indicates taint policies that are "default-safe" and the other half 340 indicates policies that are "optional". A "default-safe" policy is one that defaults to an "on" (e.g., "restricted") state for existing software. For example, if a new CPU introduces a data-dependent timing behavior in its multiplier and a new taint policy that disables this data-dependent timing when multiplying with tainted data, the new policy is considered a "default-safe" policy, meaning it defaults to being enabled. This protects existing software that uses taint marks but is unaware of the new micro-architectural enhancement (and policy bit) being added. For another example, a new taint policy to restrict conditional branches using tainted data may be implemented. This policy bit in the taint policy register 325 is an "optional" policy so it defaults to not being enabled. Software which is aware of the new bit and desires it may enable it, but existing software does not default to using it. This design provides for safe migration because new targets which support at least the same policy bits as the current target are guaranteed to be at least as safe (from a side channel standpoint). New targets that do not support the minimum set of taint policy bits required by a virtual machine are not considered eligible migration targets.

Figure 4:
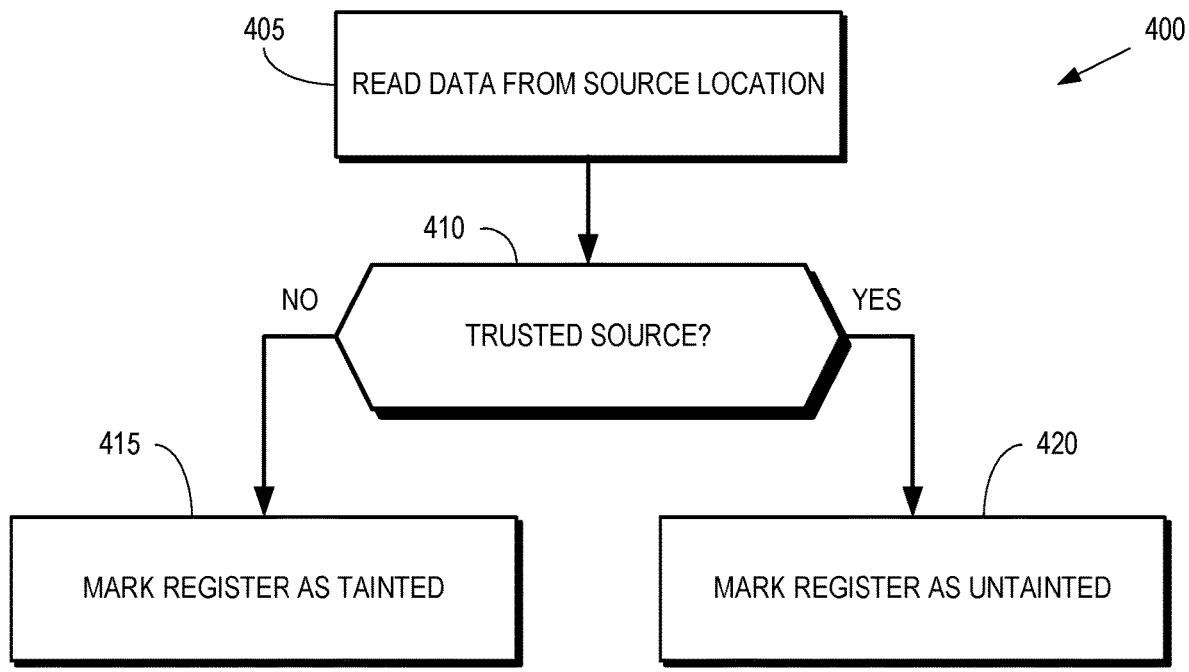
FIG. 4 is a flow diagram of a method of selectively marking architectural registers as tainted according to some embodiments.

FIG. 4 is a flow diagram of a method 400 of selectively marking architectural registers as tainted according to some embodiments. The method 400 is implemented in processing circuitry including some embodiments of the processing system 100 shown in FIG. 1, the processor core 200 shown in FIG. 2, and the processing system 300 shown in FIG. 3.

At block 405, a processor core (or other processing unit or system) reads data from a source location such as a location in a memory indicated by an address in the corresponding read instruction. The data read from the source location is loaded into an architectural register indicated in the read instruction. At decision block 410, the processor core determines whether the source is a trusted source. For example, a source is considered a trusted source if it is associated with a process operating at the same trust level or a more trusted level than the instruction attempting to read the data from the source location. If the source is not a trusted source, the method 400 flows to block 415. If the source is a trusted source, the method 400 flows to block 420.

At block 415, the processor core marks the architectural register as a tainted architectural register. In some embodiments, the processor core taints the architectural register by modifying a value of one or more bits in a data structure associated with the architectural register. At block 420, the processor core marks the architectural register as an untainted architectural register. In some embodiments, the default value of the bits that indicate tainting is a value that indicates that the architectural registers are untainted. In that case, the processor core marks the architectural registers as untainted by not modifying the value of the one or more bits in the data structure associated with the architectural register. The processor core can also mark the architectural registers as untainted by modifying the value from a value that indicates a tainted architectural register to a value that indicates an untainted architectural register.

Figure 5:
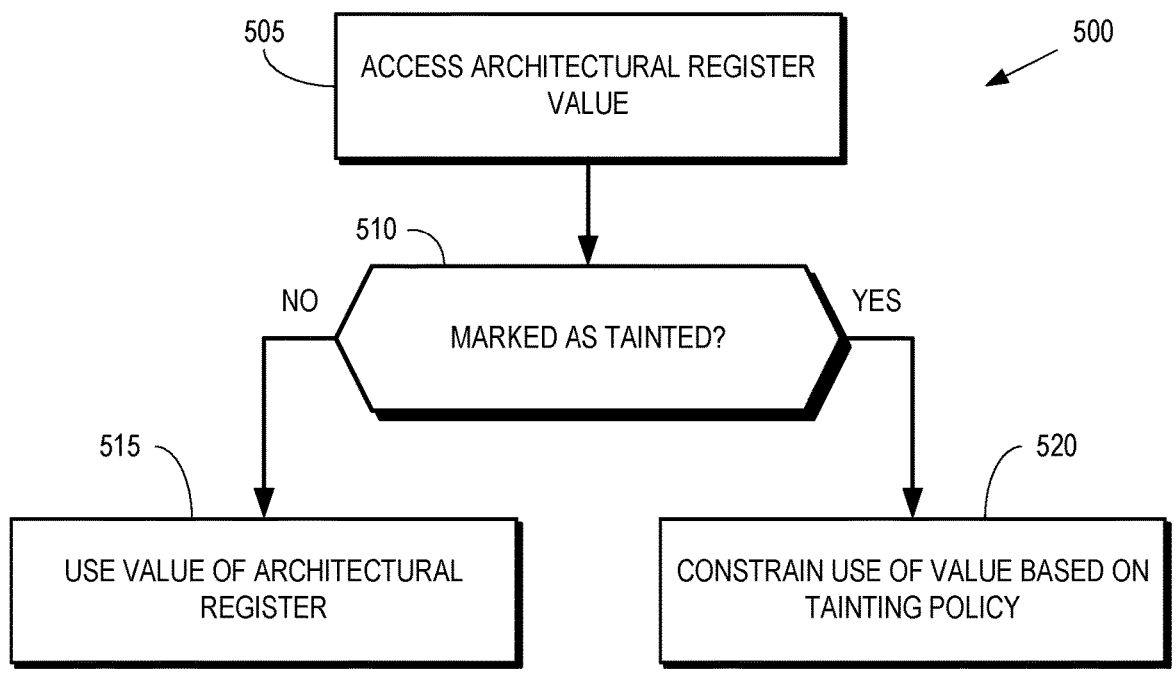
FIG. 5 is a flow diagram of a method of selectively constraining the use of architectural registers based on whether the architectural registers are tainted according to some embodiments.

FIG. 5 is a flow diagram of a method 500 of selectively constraining the use of architectural registers based on whether the architectural registers are tainted according to some embodiments. The method 500 is implemented in processing circuitry including in some embodiments of the processing system 100 shown in FIG. 1, the processor core 200 shown in FIG. 2, and the processing system 300 shown in FIG. 3.

At block 505, a processor core (or other processing unit or system) accesses a value stored in an architectural register, e.g., in response to receiving an instruction or operation that operates on the stored value. The processor core also accesses a data structure associated with the architectural register that includes information indicating whether one or the architectural registers are tainted. At decision block 510, the processor core determines whether the architectural register is marked as tainted. In some embodiments, the processor core identifies tainted architectural registers based on values stored in the corresponding entry in the data structure, as discussed herein. If the architectural register is not marked as tainted, the method 500 flows to block 515. If the architectural register is marked as tainted, the method 500 flows to block 520.

At block 515, the processor core uses the value of the architectural register without constraint because the value is untainted. At block 520, use of the value of the architectural register is constrained based on a taint handling policy, such as the taint handling policy stored in a taint handling register, as discussed herein.

Figure 6:
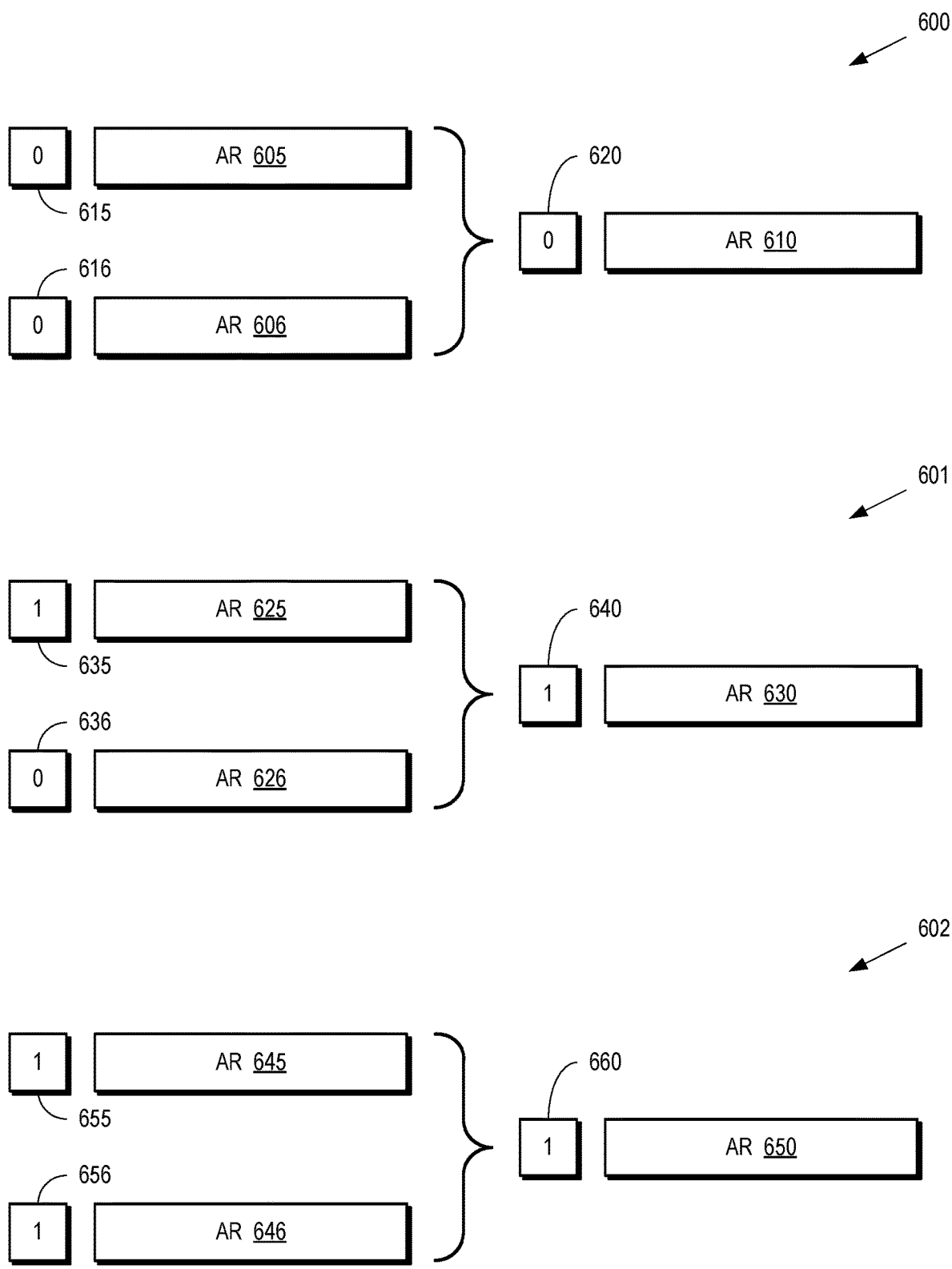
FIG. 6 is a block diagram showing propagation of taint marks for source and destination architectural registers of operations according to some embodiments.

FIG. 6 is a block diagram showing propagation of taint marks for source and destination architectural registers of operations 600, 601, 602 according to some embodiments. The operations 600-602 are performed by processing circuitry including some embodiments of the processing system 100 shown in FIG. 1, the processor core 200 shown in FIG. 2, and the processing system 300 shown in FIG. 3.

The operation 600 receives values in the architectural registers 605, 606 as source registers and then provides the result of the operation to the architectural register 610, which is the destination register of the operation 600. For example, the operation 600 could be an addition operation that adds the values in the architectural registers 605, 606 and provides the sum of the values to the architectural register 610. The architectural registers 605, 606 are associated with taint markings 615, 616. In the illustrated embodiment, the taint markings 615, 616 have values of "0" that indicate that the values stored in the architectural registers 605, 606 are untainted. The taint markings 615, 616 are propagated by combining the values of the taint markings 615, 616, e.g., using an OR operation, and storing the value in the taint marking 620 that is associated with the architectural register 610. In the illustrated embodiment, the taint marking 620 is given a value of "0" to indicate that the value stored in the architectural register 610 is untainted.

The operation 601 receives values in the architectural registers 625, 626 as source registers and then provides the result of the operation to the architectural register 630, which is the destination register of the operation 601. For example, the operation 601 could be an addition operation that adds the values in the architectural registers 625, 626 and provides the sum of the values to the architectural register 630. The architectural registers 625, 626 are associated with taint markings 635, 636. In the illustrated embodiment, the taint marking 635 has a value of "1" that indicates that the value stored in the architectural register 625 is tainted. The taint marking 636 has a value of "0" that indicates that the value stored in the architectural register 626 is untainted. The taint markings 625, 626 are propagated by combining the values of the taint markings 625, 626, e.g., using an OR operation, and storing the value in the taint marking 640 that is associated with the architectural register 630. In the illustrated embodiment, the taint marking 640 is given a value of "1" to indicate that the value stored in the architectural registers 630 is tainted.

The operation 602 receives values in the architectural registers 645, 646 as source registers and then provides the result of the operation to the architectural register 650, which is the destination register of the operation 602. For example, the operation 602 could be an addition operation that adds the values in the architectural registers 645, 646 and provides the sum of the values to the architectural register 650. The architectural registers 645, 646 are associated with taint markings 655, 656. In the illustrated embodiment, the taint markings 655, 656 have values of "1" that indicates that the values stored in the architectural registers 645, 656 are tainted. The taint markings 645, 646 are propagated by combining the values of the taint markings 645, 646, e.g., using an OR operation, and storing the value in the taint marking 660 that is associated with the architectural register 650. In the illustrated embodiment, the taint marking 660 is given a value of "1" to indicate that the value stored in the architectural register 650 is tainted.

In some embodiments, hardware (such as a processing system, processing unit, processor core, ASIC, FPGA, and the like) automatically propagates taints in a well-documented manner so that the set of registers that are tainted at a specific point in time is architecturally known and can be anticipated by a compiler. In addition to general purpose registers, some embodiments of the tainting architecture support tainting of floating point registers. For example, taint marking of floating point registers is useful if floating point registers are used in memory references or other operations that may cause noticeable side effects. The taint status of the architectural registers is readable and writeable by software. The taint status is also saved across context switches and other architectural events.

During program execution, tainted data is sometimes stored in memory, in which case the taint markings are retained for the data stored in the memory. Storing tainted data occurs due to software explicitly writing a tainted value into its memory space, compiler-generated spill/fill sequences, or other situations. Taint tracking through memory is performed using explicit typing or data encryption/obfuscation.

In explicit typing, the "type" of data (tainted or non-tainted) is stored in addition to the data value itself. When a value is loaded from memory, the type information is also loaded and consumed by a CPU (or other processor) in order to appropriately affect the execution of subsequent instructions. Values are stored and loaded without losing any taint information when explicit typing is used. In some embodiments, granularity of the type information depends on the capabilities or configuration of the hardware, e.g. 1 type bit per 8 bytes can be used to indicate the type of the value represented by the 8 bytes. In some embodiments, software explicitly indicates on every load if the data being read is expected to be tainted. If a load expects tainted data but sees non-tainted data, hardware taints the result of the load and handles it accordingly. If a load expects non-tainted data but sees tainted data, hardware stops speculation. The hardware architecture may treat this as an error condition or may wait until the load becomes non-speculative before allowing it to proceed.

Tracking the taint status of data requires significant memory overhead. Supporting granular taint marks across large regions of memory may require significant memory overhead. Hardware architectures may support trade-offs, such as limiting the memory that can be tainted, in order to achieve acceptable performance.

Figure 7:
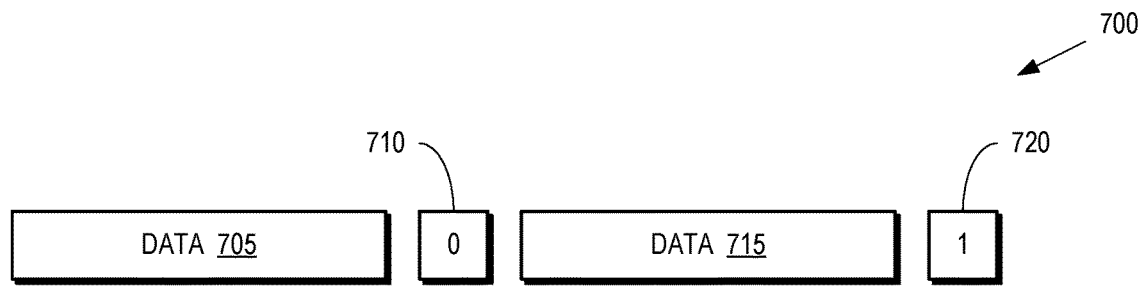
FIG. 7 is a block diagram of a portion of the memory that is used to implement explicit typing by storing data that is written to the memory from an architectural register according to some embodiments.

FIG. 7 is a block diagram of a portion 700 of the memory that is used to implement explicit typing by storing data that is written to the memory from an architectural register according to some embodiments. As discussed herein, the taint markings of architectural registers are tracked when they are into a memory location so that the taint markings are preserved when the values at the memory locations are loaded back to architectural registers. In the illustrated embodiment, the taint markings are tracked in the portion 700 of the memory by including an additional bit (or more than one bit) to indicate whether the associated values are tainted. The data 705 is written to the portion 700 of the memory from an untainted architectural register. An additional bit 710 is therefore set to a value "0" to indicate that the data 705 is untainted. The data 715 is written to the portion 700 of the memory from a tainted architectural register. An additional bit 720 is therefore set to a value of "1" to indicate that the data 715 is tainted. The values of the bits 710, 720 are used to mark architectural registers as tainted or untainted when the corresponding data 705, 715 is loaded into the architectural registers.

Figure 8:
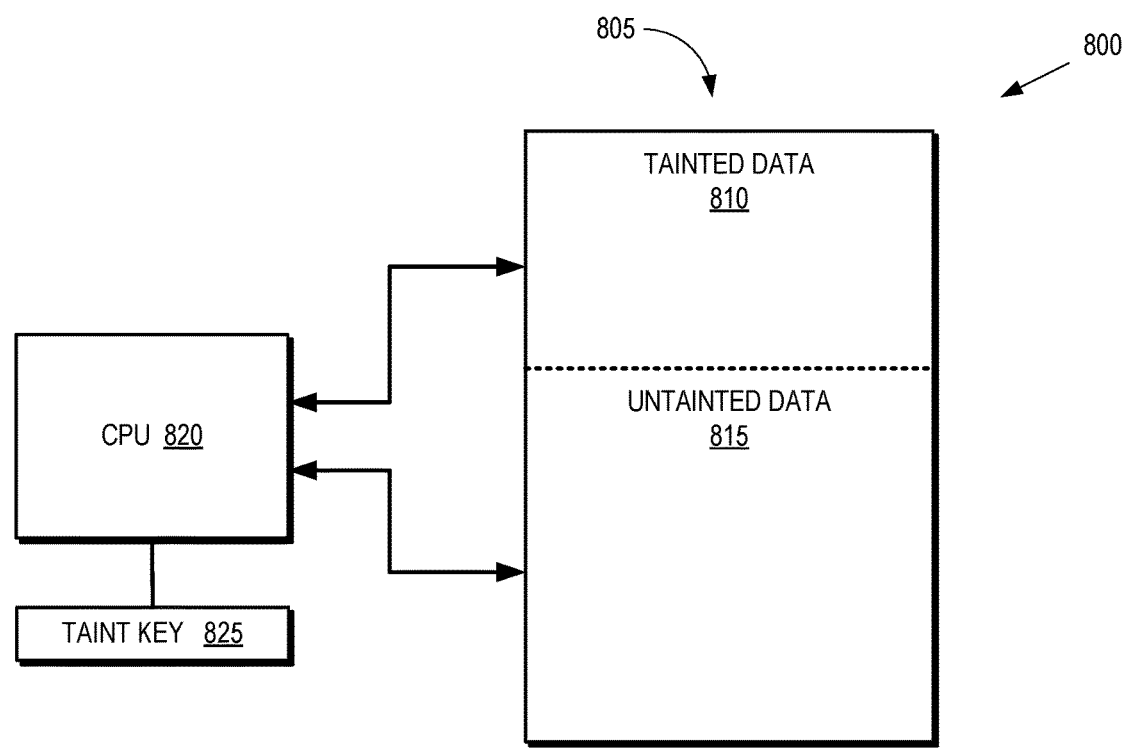
FIG. 8 is a block diagram of a processing system that is used to implement explicit typing by identifying tainted data in a memory using dedicated regions for tainted and untainted data according to some embodiments.

FIG. 8 is a block diagram of a processing system 800 that is used to implement explicit typing by identifying tainted data in a memory 805 using dedicated regions for tainted and untainted data according to some embodiments. The processing system 800 represents some embodiments of the processing system 100 shown in FIG. 1, the processor core 200 shown in FIG. 2, and the processing system 300 shown in FIG. 3.

The memory 805 is partitioned into a first region 810 and a second region 815. The first region 810 is reserved for storing tainted data that is written to the memory 805 from tainted architectural registers. The second region 815 is reserved for storing untainted data that is written to the memory 805 from untainted architectural registers. In the illustrated embodiment, a CPU 820 (or other processor core or system) receives an instruction to store information in an architectural register to the memory 805. The CPU 820 (or other hardware such as a processing system, processing unit, processor core, ASIC, FPGA, or other circuitry) determines whether the architectural register is tainted or untainted, e.g., using a data structure that stores taint markings for the architectural registers. Based on the determination, the CPU 820 stores the data from the architectural register in either the first region 810 (tainted data) or the second region 815 (untainted data). The CPU 820 also marks architectural registers as tainted or untainted in response to reading information from the regions 810, 815. For example, the CPU 820 marks an architectural register as tainted in response to loading information from the region 810 into the architectural register. For another example, the CPU 820 marks an architectural register is untainted in response to loading information from the region 815 into the architectural register.

Instead of (or in addition to) explicit typing, some embodiments of tainting architectures encrypt or otherwise obfuscate tainted values when stored in memory. As used herein, the term "obfuscate" is understood to mean hiding the contents of the data through a non-cryptographic algorithm such as a combination of shifts and XORs. The term "encryption" refers to hiding data through a cryptographic algorithm such as AES. Encryption may therefore be thought of as a form of obfuscation that uses cryptographic protection instead of non-cryptographic. Some embodiments of the processing system include a register 825 that stores a taint key used by the cryptographic algorithm used to encrypt or otherwise obfuscate the tainted values stored in the tainted the data region 810. Values in the register 825 can be changed by software, e.g., to provide fresh keys at predetermined intervals, in response to an event, and the like. In some embodiments, taint encoding and decoding operations are defined to perform the encryption/decryption/obfuscation/de-obfuscation of the data that is written to or read from the memory 805.

In order to implement tainting using encryption or other obfuscation, instructions that read from memory explicitly specify if the memory being read or written is expected to be tainted. Write instructions determine whether their source data is tainted or not using information from (or associated with) the register files such as the data structure 305 shown in FIG. 3. When reading tainted memory, the processor decrypts or otherwise de-obfuscates the values. When writing tainted values to memory, the values are encrypted or obfuscated. In some embodiments, encrypting/decrypting or obfuscating/de-obfuscating data is handled by an additional instruction that is distinct and separate from the operation of loading or storing the value in memory.

Obfuscation protects against side channels if the attacker cannot anticipate what value the processor will use speculatively. For this reason, security is weakened if the attacker is able to determine the "key" used in obfuscation, including through side channel attacks. Assuming the obfuscation algorithm is cryptographically weak (e.g., based on simple shift/rotate operations applied to the data), the obfuscation key is frequently changed to prevent potential attacks. For instance, the key can be changed on every system call. If this is done, software must explicitly preserve tainted values across key changes. For instance, a kernel could encrypt a tainted value with a different key when preserving it across multiple system calls.

Using a cryptographic encryption algorithm for tainted data improves the resiliency against attacks, especially if the algorithm uses information like the address of where the data is being stored to as an input to the encryption algorithm. This can make it difficult for an attacker to successfully gain control of speculatively used values in a deterministic manner, obviating the need for frequent key rotations. For implementation efficiency, the use of obfuscation, such as encryption, may impose additional requirements on the storing of tainted data. For instance, an architecture may store tainted data using specific ISA instructions or the processor may store the tainted data in specially marked memory, as discussed above.

Figure 9:
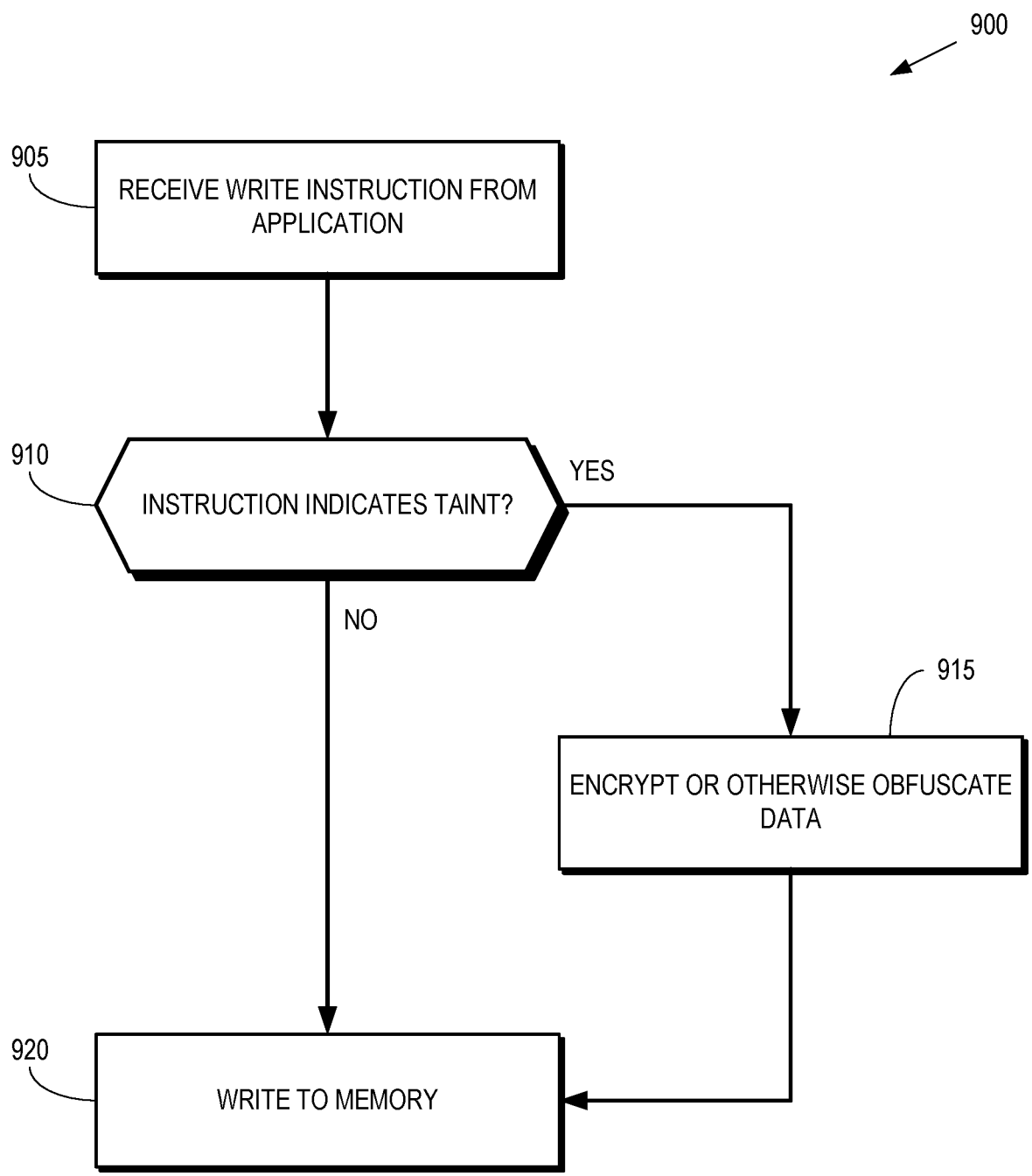
FIG. 9 is a flow diagram of a method of encrypting or otherwise obfuscating data stored in a memory from a tainted architectural register according to some embodiments.

FIG. 9 is a flow diagram of a method 900 of encrypting or otherwise obfuscating data stored in a memory from a tainted architectural register according to some embodiments. The method 900 is implemented in processing circuitry including some embodiments of the processing system 100 shown in FIG. 1, the processor core 200 shown in FIG. 2, and the processing system 300 shown in FIG. 3.

At block 905, a processor core (or other processing unit or system) receives a write instruction from an application. The write instruction includes information indicating an architectural register and an address of a location in a memory. The processor core executes the write instruction by writing the data stored in the architectural register to the memory location indicated by the address. In some embodiments, the write instruction determines whether the data stored in the architectural register is tainted using information from (or associated with) the architectural register such as the data structure 305 shown in FIG. 3. In other embodiments, the write instruction (or another instruction associated with the write instruction) includes information indicating whether the data in the architectural register is tainted.

At decision block 910, the processor core determines whether the data in the architectural register is tainted. The processor core makes this determination based on the information in the received instructions or, in some cases, a data structure that includes taint markings for the architectural registers. If the data is tainted, the method 900 flows to block 915. If the data is untainted, the method flows to block 920.

At block 915, the processor core encrypts or otherwise obfuscates the data prior to storing the data at the memory location indicated by the address in the write instruction. The method then flows to block 920. At block 920, the data from the architectural register (either the raw untainted data or the encrypted/obfuscated tainted data) is written to the location in the memory indicated by the address in the write instruction.

Figure 10:
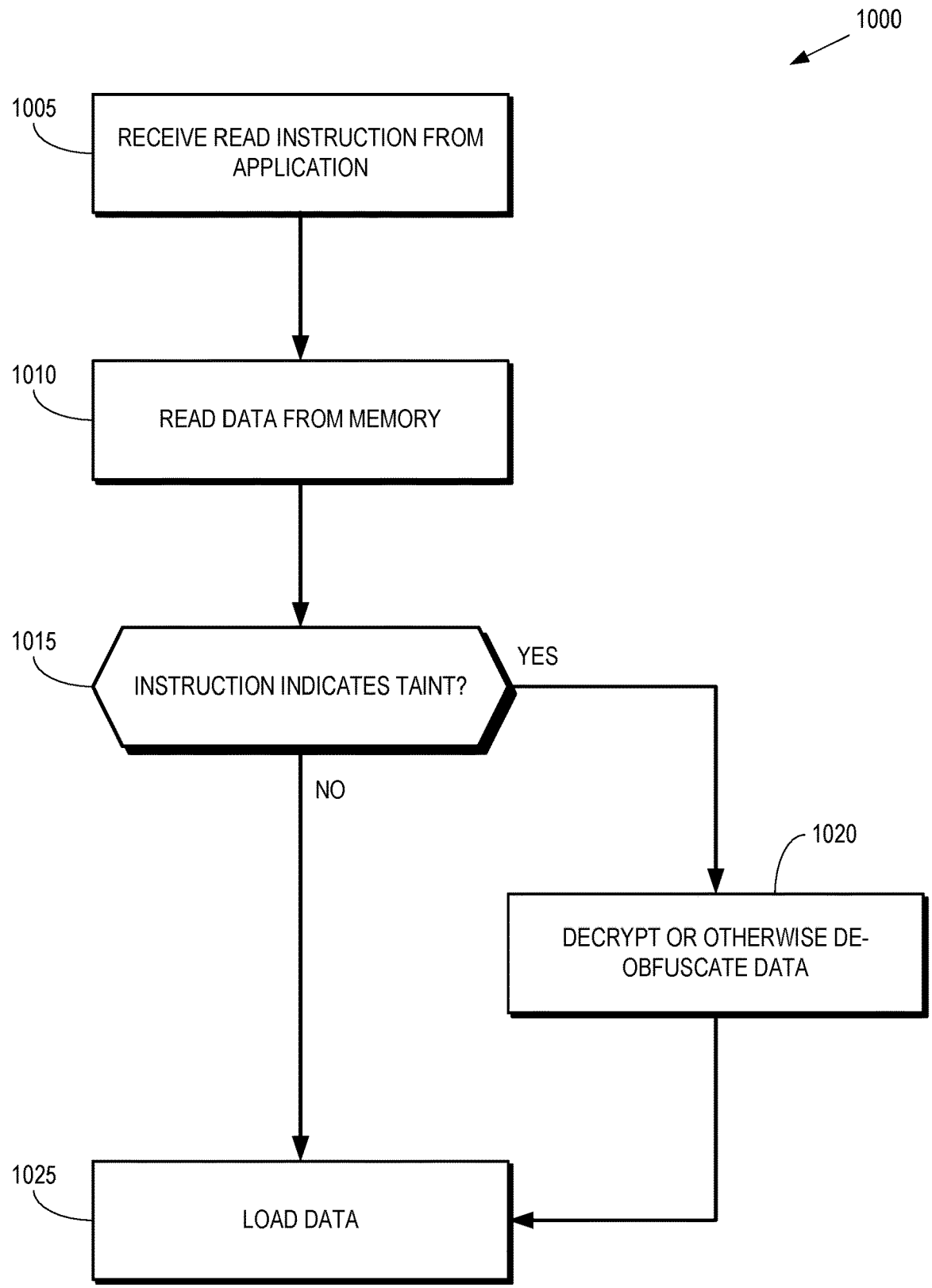
FIG. 10 is a flow diagram of a method of decrypting or otherwise de-obfuscating data prior to loading tainted data from a memory into a tainted architectural register according to some embodiments.

FIG. 10 is a flow diagram of a method 1000 of decrypting or otherwise de-obfuscating data prior to loading tainted data from a memory into a tainted architectural register according to some embodiments. The method 1000 is implemented in processing circuitry including some embodiments of the processing system 100 shown in FIG. 1, the processor core 200 shown in FIG. 2, and the processing system 300 shown in FIG. 3.

At block 1005, a processor core (or other processing unit or system) receives a read (or load) instruction from an application. The read (or load) instruction includes information indicating an architectural register and an address of a location in a memory. The processor core executes the read (or load) instruction by reading (at block 1010) the data stored in the memory location indicated by the address and loading the data into the architectural register. The read/load instruction (or another instruction associated with the read/load instruction) includes information indicating whether the data in the architectural register is tainted.

At decision block 1015, the processor core determines whether the instruction indicates that the data stored in the memory is tainted. If the data is tainted, the method 1000 flows to block 1020. If the data is untainted, the method 1000 flows to block 1025.

At block 1020, the processor core decrypts or otherwise de-obfuscates the data that is read from the memory. The method 1000 then flows to block 1025. At block 1025, the processor core loads the unencrypted or otherwise de-obfuscated data into the architectural register.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   marking a subset of a set of architectural registers in a processing system to indicate that speculative use of data in the subset of the set of architectural registers is constrained based on a taint handling policy; and
   preventing use of at least one speculation feature on data in the subset.

2. The method of claim 1, wherein marking the subset comprises modifying values of bits associated with the subset to indicate that the subset is tainted.

3. The method of claim 2, wherein:
   each architectural register of the set of architectural registers is associated with a corresponding bit of a plurality of bits; and
   modifying the values of the bits associated with the subset comprises modifying values of the plurality of bits for each architectural register in the subset.

4. The method of claim 2, wherein marking the subset comprises executing an instruction that explicitly marks the subset as tainted or untainted by instructing a processor to modify the values of the bits associated with the subset.

5. The method of claim 2, wherein marking the subset comprises modifying the values of the bits associated with the subset in response to data in the subset crossing a hardware privilege boundary.

6. The method of claim 2, wherein marking the subset comprises modifying the values of the bits associated with architectural registers controlled by a user in response to a control flow crossing a hardware privilege boundary.

7. The method of claim 2, further comprising:
   reading the values of the bits to determine which of the set of the architectural registers are tainted.

8. The method of claim 2, further comprising:
   writing at least one of the values of the bits to a location in a memory using a write instruction that indicates the location in the memory.

9. The method of claim 1, wherein preventing use of the at least one speculation feature comprises disabling the at least one speculation feature to prevent a pipeline in the processing system from utilizing data loaded from the subset until a load instruction used to load the data from the subset has retired.

10. The method of claim 1, further comprising:
    accessing a policy register that stores values that indicate policies applied to tainted architectural registers; and
    wherein preventing use of the at least one speculation feature comprises disabling the at least one speculation feature based on a policy indicated by a value stored in the policy register.

11. The method of claim 10, wherein the policy register is subdivided into default policies that are implemented unless specifically disabled and optional policies that are not implemented unless specifically enabled.

12. The method of claim 1, wherein the subset comprises at least one source register for an instruction; and the method further comprising:
    propagating tainting from the at least one source register to a destination register of the instruction.

13. The method of claim 12, wherein propagating the tainting from the at least one source register to the destination register comprises modifying at least one value of at least one bit associated with the destination register to indicate that the destination register is tainted.

14. The method of claim 1, further comprising:
    tracking taint markings of the subset in response to storing data from the subset in a memory.

15. The method of claim 14, wherein tracking the taint markings of the subset comprises storing a portion of the data in the memory and storing at least one bit in the memory, the at least one bit having a value that indicates that the portion is tainted.

16. The method of claim 14, wherein tracking the taint markings of the subset comprises storing the data in a predetermined region of the memory that is allocated for storing tainted data.

17. The method of claim 14, wherein tracking the taint markings comprises obfuscating the data prior to storing the obfuscated data in the memory.

18. The method of claim 17, further comprising:
configuring read instructions or write instructions that involve the subset to specify that the data in the subset is tainted;
obfuscating, at the processing system, the data prior to storing the data in the memory in response to a write instruction; and
de-obfuscating the data at the processing system after reading the data from the memory and prior to storing the data in the subset.

19. An apparatus comprising:
processing circuitry configured to:
mark a subset of a set of architectural registers to indicate that speculative use of data in the subset is constrained based on a taint handling policy; and
prevent use of at least one speculation feature on data in the subset.

20. The apparatus of claim 19, further comprising:
a physical register file including physical registers that are associated with architectural registers; and
a data structure including bits associated with the architectural registers, wherein the processing circuitry is configured to modify values of the bits associated with the subset to indicate that the subset is tainted.

21. The apparatus of claim 20, wherein:
the data structure comprises a plurality of bits associated with each of the architectural registers;
each architectural register of the set is associated with a corresponding bit of a plurality of bits; and
the processing circuitry is configured to modify values of the plurality of bits for each architectural register in the subset.

22. The apparatus of claim 20, wherein the processing circuitry is configured to modify the values of the bits associated with the subset by executing an instruction that explicitly marks the subset as tainted.

23. The apparatus of claim 20, wherein the processing circuitry is configured to taint or untaint the subset by modifying the values of the bits associated with the subset in response to data in the subset crossing a hardware privilege boundary.

24. The apparatus of claim 20, wherein the processing circuitry is configured to taint the subset by modifying the values of the bits associated with architectural registers controlled by a user in response to a control flow crossing a hardware privilege boundary.

25. The apparatus of claim 20, wherein the processing circuitry is configured to read the values of the bits to determine which of the architectural registers are tainted.

26. The apparatus of claim 20, wherein the processing circuitry is configured to write at least one of the values of the bits to a location in a memory using a write instruction that indicates the location in the memory.

27. The apparatus of claim 19, wherein:
the processing circuitry implements a pipeline for executing instructions; and
the processing circuitry is configured to prevent the pipeline from utilizing data loaded from the subset until a load instruction used to load the data from the subset has retired.

28. The apparatus of claim 19, further comprising:
a policy register configured to store values that indicate policies applied to marked architectural registers, and wherein the processing circuitry is configured to prevent use of the at least one speculation feature by disabling the at least one speculation feature based on a policy indicated by a value stored in the policy register.

29. The apparatus of claim 28, wherein the policy register is subdivided into default policies that are implemented unless specifically disabled by the processing circuitry and optional policies that are not implemented unless specifically enabled by the processing circuitry.

30. The apparatus of claim 19, wherein:
the subset comprises a source register for an instruction; and
the processing circuitry is configured to propagate marking from the source register to a destination register of the instruction.

31. The apparatus of claim 30, wherein the processing circuitry is configured to propagate the marking by modifying at least one value of at least one bit associated with the destination register to indicate that the destination register is tainted.

32. The apparatus of claim 19, wherein the processing circuitry is configured to track taint markings of the subset of the architectural registers in response to storing data from the subset in a memory.

33. The apparatus of claim 32, wherein the processing circuitry is configured to:
store a portion of the data in the memory; and
store at least one bit in the memory, the at least one bit having a value that indicates that the portion is tainted.

34. The apparatus of claim 32, wherein the processing circuitry is configured to store the data in a predetermined region of the memory that is allocated for storing tainted data.

35. The apparatus of claim 32, wherein the processing circuitry is configured to obfuscate the data prior to storing the obfuscated data in the memory.

36. The apparatus of claim 35, wherein:
read instructions or write instructions that involve the subset of the architectural registers specify that the data in the subset is tainted;
the processing circuitry obfuscates the data prior to storing the data in the memory in response to a write instruction; and
the processing circuitry is configured to de-obfuscate the data after reading the data from the memory and prior to storing the data in the subset of the architectural registers.

37. An apparatus comprising:
processing circuitry configured to:
speculatively execute an instruction that operates on values stored in architectural registers; and
disable at least one speculation feature for the instruction in response to at least one of the architectural registers being tainted to indicate that speculative use of data in the at least one of the architectural registers is constrained based on a taint handling policy.

38. The apparatus of claim 37, further comprising:

a physical register file including physical registers that are associated with corresponding architectural registers; and a data structure including bits associated with the architectural registers, wherein the processing circuitry is configured to modify values of a subset of the bits to indicate that a corresponding subset of the architectural registers as tainted.

39. The apparatus of claim 37, further comprising:

a policy register configured to store values that indicate policies applied to the at least one of the architectural registers that is constrained based on the taint handling policy, and wherein the processing circuitry is configured to disable the at least one speculation feature based on the taint handling policy indicated by a value stored in the policy register.

40. The apparatus of claim 37, wherein the processing circuitry is configured to track taint markings of the at least one of the architectural registers that is constrained based on the taint handling policy in response to storing data from the at least one of the architectural registers in a memory.

* * * * *